United States Patent [19]

Lemelson et al.

[11] Patent Number: 4,592,042
[45] Date of Patent: May 27, 1986

[54] RECORD CARD TRANSDUCING APPARATUS AND METHOD

[76] Inventors: Jerome H. Lemelson, 85 Rector St., Metuchen, N.J. 08840; Christian Grund, 707 L. Eagle Heights, Madison, Wis. 53705

[21] Appl. No.: 467,139
[22] Filed: Feb. 16, 1983
[51] Int. Cl.⁴ .................. G11B 25/04; G11B 23/00
[52] U.S. Cl. ................................. 369/258; 235/475; 235/486; 360/2; 369/264; 369/270; 369/271
[58] Field of Search ........... 360/2; 369/258, 270, 369/264, 271; 235/449, 475, 479, 486

[56] References Cited

U.S. PATENT DOCUMENTS

| | | | |
|---|---|---|---|
| 2,092,668 | 9/1937 | Goldsmith | 369/280 |
| 3,553,440 | 1/1971 | Dale | 360/2 |
| 3,674,278 | 7/1972 | Bowerman | 369/176 |
| 3,761,687 | 9/1973 | Swett et al. | 360/2 |
| 3,787,636 | 1/1974 | Brandt et al. | 360/2 |
| 3,832,547 | 8/1974 | Silverman | 346/762 |
| 3,983,317 | 9/1976 | Glorioso | 369/109 |
| 3,995,256 | 11/1976 | Taniguchi et al. | 360/2 |
| 4,014,604 | 3/1977 | Schwartz | 360/2 |
| 4,084,198 | 4/1978 | Lemelson | 235/449 |
| 4,197,988 | 4/1980 | Moss et al. | 360/2 |
| 4,399,477 | 8/1983 | Bryer | 369/41 |
| 4,401,994 | 8/1983 | Witts et al. | 360/2 |
| 4,416,001 | 11/1983 | Ackerman et al. | 369/44 |

Primary Examiner—Steven L. Stephan

[57] ABSTRACT

A record card transducing apparatus and method employing a rotational support, such as a turntable for supporting a record card, to cause the card to be driven in a circular path when the turntable rotates, wherein one or more circular tracks of the card may be recorded on or reproduced from as the card is so rotated. In one form, the card is so positioned on the turntable, and its concentric circular tracks are configured to center at center of rotation of the turntable so that as the card is rotated, a magnetic recording and/or reproduction transducer may be moved across the turntable into alignment with a selected circular track and may scan such selected circular track as the turntable rotates. In a particular form, a magnetic record card or a card having a wide magnetic record strip, is manually or automatically placed in a cavity formed in the top wall of a circular turntable, disposing its magnetic recording surface or strip in the plane of or above the plane of the upper surface of the turntable. The card may be automatically ejected from the turntable when transducing is completed or manually removed therefrom. The magnetic recording system may also be changed to an electro-optical system.

20 Claims, 9 Drawing Figures

RECORD CARD TRANSDUCING APPARATUS AND METHOD

SUMMARY OF THE INVENTION

This invention relates to an apparatus and method for recording on and reproducing from record cards, such as credit cards and other forms of cards containing magnetic recording material. In particular, the invention is directed to an automatic transducing apparatus and method employing a turntable to receive, preposition and retain record cards during a recording and/or reproduction operation involving one or more transducers which are carried by a pivoted or otherwise supported and driven arm mounted above the turntable.

It is known in the art to record information on a record card and to reproduce such information when it is needed. It is also known to record and reproduce information with respect to disc-shaped record members which are rotated during the transducing functions by means of a turntable. The instant invention employs a new and improved recording and/or reproduction arrangment involving record cards which are supported by rotary fixtures or turntables which are power rotated to cause the cards supported thereby to ascribe circular paths so as to define a plurality of circular record tracks which may be easily recording on or reproduced from by means of a transducer or transducers supported by a conventional mechanism employed for conventional record disc transducing. As a result proven mechanisms employed for high density disc recording and reproduction functions may be employed to effect high density card recording and reproduction functions at relatively low cost and in a very rapid and effective manner.

Accordingly it is a primary object of this invention to provide a new and improved apparatus and method for recording on and reproducing from record cards.

Another object is to provide an apparatus and method for effecting high density transducing with respect to record cards.

Another object is to provide an improved transducing arrangement for use with record cards permitting high density transducing to be effected with respect to circular tracks of the record cards.

Another object is to provide an apparatus and method for effecting very high density recordings with respect to record cards and the selective reproduction of selected of such high density recordings to the exclusion of others.

Another object is provide an improved apparatus and method for effecting circular track recording with respect to record cards.

Another object is to provide an apparatus and method for effecting the selected reproduction of information recorded on selected circular tracks of a record card.

Another object is to provide a system for selectively recording and/or selectively reproducing from multiple track record cards without the need for recording on the card and reproducing therefrom track locating signals.

Another object is to provide an apparatus and method for selectively transducing with respect to record cards, which method is easily effected by unskilled personnel.

Another object is to provide an apparatus and method for transduing information with respect to selected circular tracks of record cards wherein such selected information is accessible in a relatively short period of time.

With the above and such other objects in view as may herein after more fully appear, the invention consists of the novel constructions, combinations and arrangements of parts and method for transducing with respect to record cards, such as magnetic or optically scannable record cards, as will be more fully described and illustrated in the accompanying drawings, but it is to understood that changes, variations and modifications may be resorted to which fall within the scope of the invention as claimed.

Figures 1, 2, 3, 4, 5, 6:
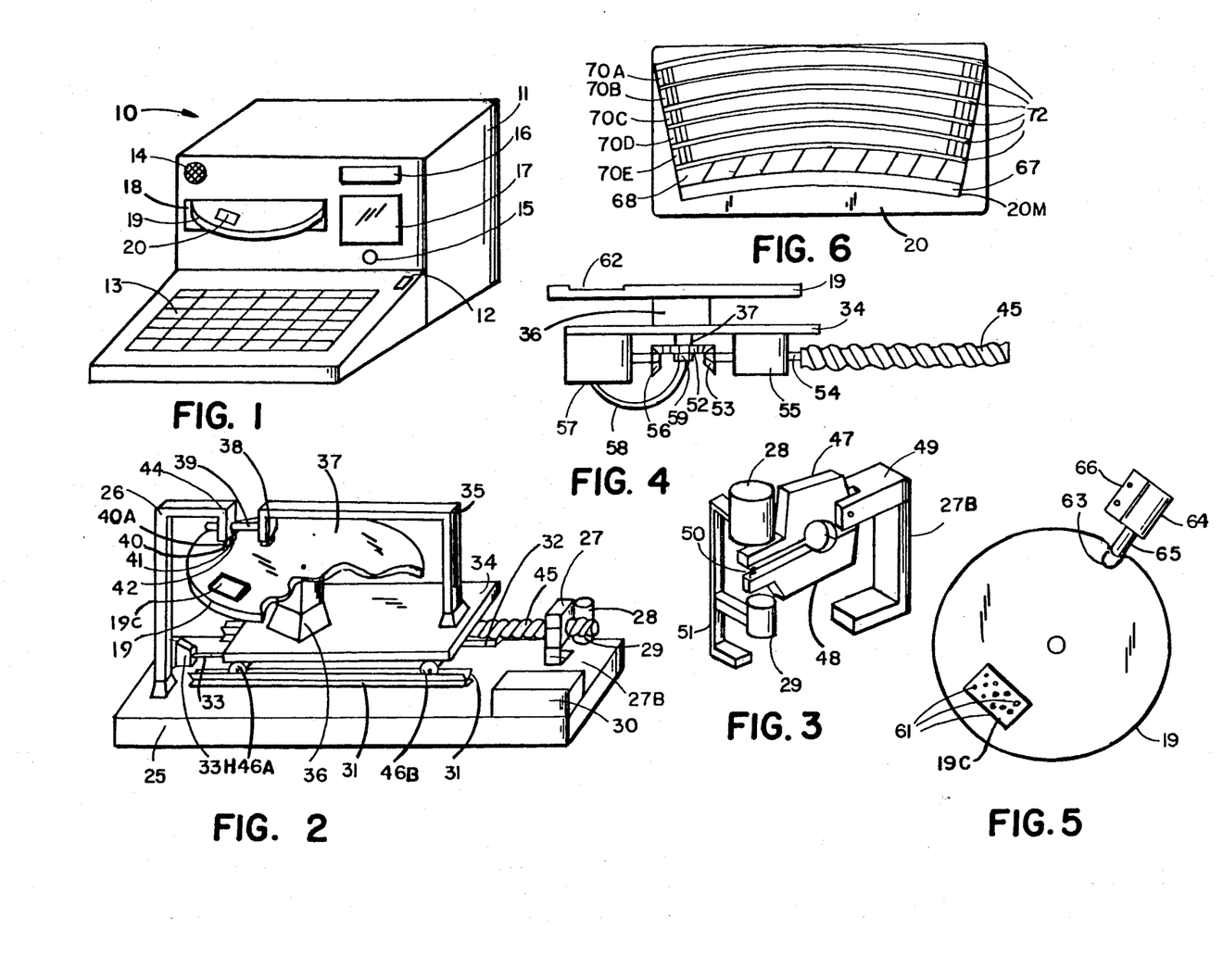
FIG. 1 is an isometric view of a magnetic card transducing machine or terminal.
FIG. 2 shows certain details of the mechanical apparatus of FIG. 1 in isometric form with parts broken away.
FIG. 3 is an isometric view of components of a drive mechanism associated with FIG. 2.
FIG. 4 is a side view of other components of FIG. 2.
FIG. 5 is a plan view of a turntable associated with the apparatus of FIGS. 1 and 2.
FIG. 6 is a plan view of a typical record card usable with the apparatus of FIGS. 1 and 2.

In FIG. 1 is shown details of a transaction recording system 10 which is also operable for reproducing recorded signals from record cards. Supported by a housing 11 are a digitally encoded data entry keyboard 13, a voice identification input microphone 14, an on-off bistable manual switch 12, a start-reading cycle push button operated switch 15, a character display 16 and an information field display 17 such as cathode ray tube or the like. Provided in a wall of housing 11 is a slotted opening 18 through which a portion of a turntable which is rotationally mounted within the housing 11, protrudes, which portion contains a receptacle 19C in the form of an indentation such as a shallow rectangular cavity formed in the upper surface of the turntable, which contains a credit card 20 conforming to the peripheral shape of the indentation 19C and supported therein and held flat against the bottom surface of the indentation by frictional engagement with the side walls of the indentation or other means, as positioned by hand within the indentation when the indented portion of the turntable is positioned exterior of the housing.

In FIG. 2 is shown a view of that portion of system 10 which is located interior of housing 11. Operably supported by a rigid base 25 are a read-write magnetic transducer head assembly 40A supported on an arm 26, an electronics package 30, the details of which will be described; a lead screw engagement clutch 27 with attendant solenoids 28 and 29 and a mounting bracket (27B) therefor. Guide tracks 31 and 32 are shown supported or defined by the upper surface of base 25. A negator strip spring 33 is also supported thereby and is connected at one end to the turntable support platform 34 to urge the latter towards arm 26 when the strip spring winds into its housing 33H.

Also shown attached to the turntable support platform 34 are a control track head support arm 35 and a drive gear motor 36 supporting the turntable 19 on its shaft. Affixed to and supported by the arm 35 is a control track read head 38 and a head support arm alignment bar 39. Affixed to and supported by the arm 26 are a transaction reproduction head 40, transaction recording head 41 and an erase head 42 as well as an identification or code track reading head 43. The support arm guide bar 39 passes through a tight fitting containing a non-binding guide sleeve 44 secured to the support arm 26 to effect head alignment. Supported by the undercarriage of the turntable support platform 34 are a platform drive lead screw 45 and support rollers 46A and 46B which are aligned by and roll in guide track 31 and additional rollers, which are not shown, which are aligned by and roll in such guide track 32.

In FIG. 3 is shown details of the construction of the lead screw engagement clutch 27. A half-threaded block 47 is hinged to a lower half-threaded block 48 and defines a pivotal axis 49 passing through the support bracket 30. When disengaged, the upper half block and the lower half block are held separated by a spring 50. When actuated, solenoids 28 and 29 push the upper block 47 and the lower block 48 together, thereby clamping threaded portions of the respective block around the lead screw. Solenoids 28 and 29 are supported by a bracket 51 which is rigidly affixed to platform 34.

In FIG. 4 is shown details of the turntable 19, and motor 36 driving same together with mechanical connections therefor. The motor 36, when activated, directly drives the turntable 19 on its output shaft. The drive shaft 37 of motor 36 drives a crown gear 52 which, in turn, drives a crown gear 53 on shaft 54 which rotates lead screw 45. Shaft 54 of the lead screw 45 is supported by a bearing block 55 and is free to rotate within the block.

Also driven by gear 52 is crown gear 56, which in turn, drives a vacuum pump 57 which pulls a vacuum through a passageway or base rotating a vacuum coupling 59 which is disposed in the hollow center of the shaft of the motor. Valves in the vacuum system are automatically controlled to apply vacuum to a plurality of orifices or vacuum port holes 61 formed in the wall of cavity 19C as shown in FIG. 5. Such vacuum is used to hold a credit card or other form of record card flat within the recess or indentation formed in the top of the turntable, while the latter is rotating.

In FIG. 5, a top view of turntable 19, is shown vacuum ports 61 together with the closed top of shaft 37, and the positive stock locating notch 63 formed in turntable 19. A stop solenoid 64 is shown supported on a mounting bracket 66 which is affixed to the support or table 34 and which contains a return spring for returning the shaft 65 of the solenoid to a neutral position after engaging notch 63 to predeterminately stop the turntable to position the card and/or cavity as in FIG. 1.

In FIG. 6 is shown details of a credit card 20 containing a magnetic coating or wide strip 20M supported on one side thereof. Illustrated are different configurations of recording tracks of the magnetic card which may be magnetically encoded with information in the form of digital signals. A voice identification track 67 may contain several seconds of digitally encoded signals derived from the owner speaking selected words into a microphone. Such codes may be utilized to positively identify the bearer of the card. A control track 68 is encoded with magnetic recordings of digital data which will be described. Additional transaction tracks 70A-70E are also shown, each containing signals at the start and end of recordings thereon, which recordings are referred to hereafter as "start-of-file" and "end-of-file" signal recordings. Adjacent transaction tracks 70A-70E are provided with guard bands 72 and do not contain recordings.

Figure 7:
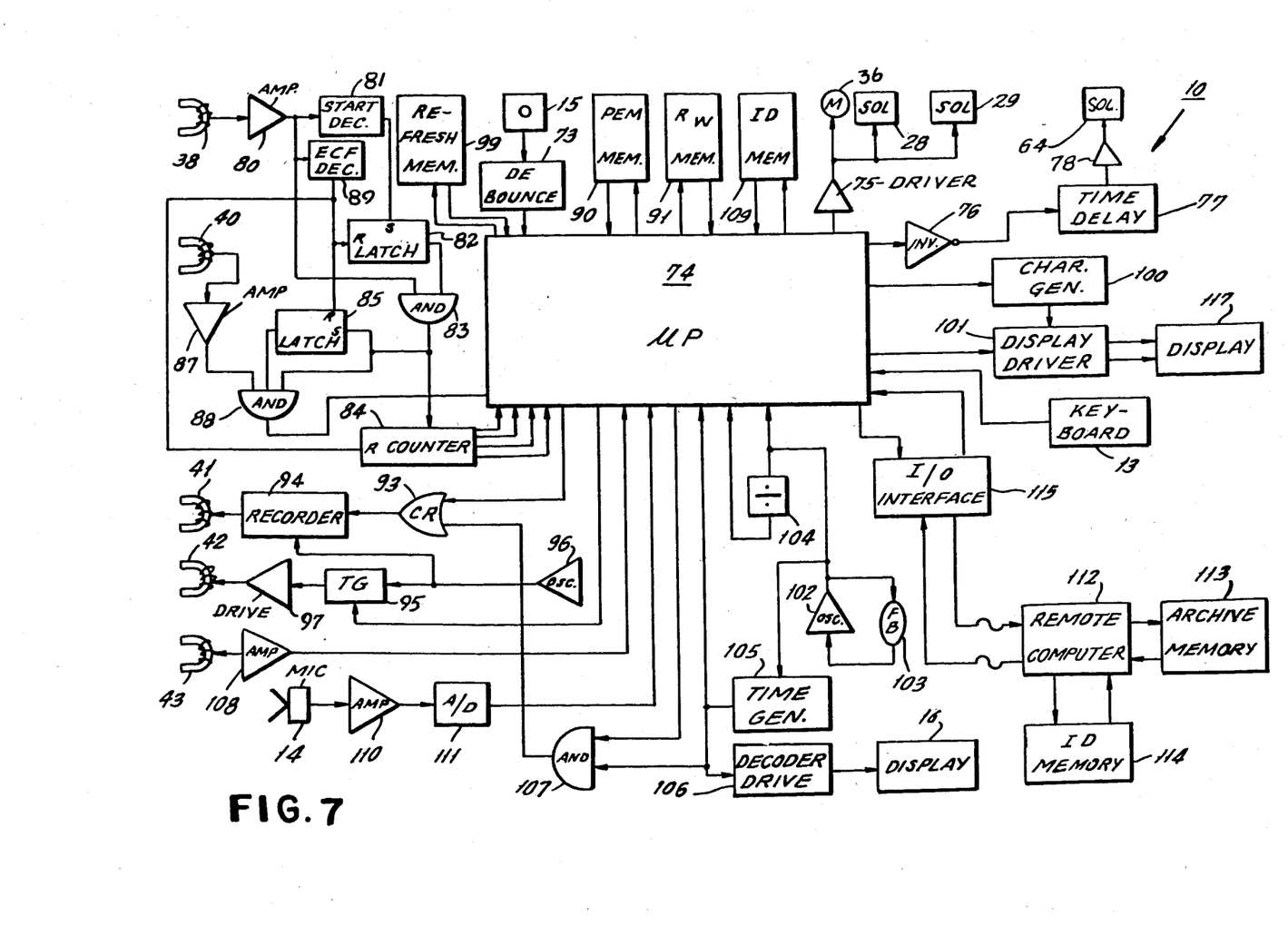
FIG. 7 is a schematic diagram of a control system for effecting and controlling operation of the apparatus of FIG. 1.

In FIG. 7 is shown a schematic diagram of system 10. In the operation of system 10, when the credit card 20 is properly located within the indentation formed in the top of the turntable, start switch 15 is closed by the momentary depression of its push button. The activation of such switch causes a signal to be passed through a debounce circuit 73 to a microcomputer or microelectronic processor 74. The microprocessor 74 passes the start signal to a driver 75 for the motor 36. The output of the motor driver 75 is also used to activate lead screw solenoids 28 and 29. Also accomplished when the microprocessor receives a signal when the start switch 15 is activated, is the deactivation of stop solenoid 64 by the activation of an inverter 76 and a time delay circuit 77 and stop solenoid driver circuit 78. Time delay 77 creates a delay only when the stop solenoid is to be activated, not during the period it is deactivated.

As the turntable 19 rotates, control track head 38 picks up data recorded on the card 20 whenever the card is rotated beneath said head. The signal detected by head 38 defines marks or locations denoting the physical center of each data bit recorded on all tracks. In this manner, card 20 is divided into data sections each of which is one bit wide. The signals generated on the output of the control track head 38 are amplified and conditioned to form digital pulses by an amplifier 80, the output of which is connected to a start decoder 81 which provides a true output when it recognizes the prerecorded bit pattern derived from recording at the beginning of the control track. When such a start bit pattern is detected, the start decoder 81 sets a latch 82, the output of which forms one input of an AND gate 83. The other input to the AND gate 83 is derived directly from the output of amplifier 80. AND gate 83 thus passes control track pulses to a counter 84 only after the start data mark recording on the track is detected. The detection of the control track mark signals is also employed to set a latch 85.

The output of counter 84 is a digital code corresponding to the number of control track data mark signals passed since the start-file-mark signal is first reproduced and this output is passed to microprocessor 74. Once a start-file-mark signal is generated and latch 85 set, system 10 is ready to reproduce or record data on the transaction tracks of the card such functions are effected as follows:

Data is read from the transaction tracks of the card by transaction read-head 40 whenever such head 40 is in direct alignment with recordings of such data on the card and the card is in rotary movement on the turntable. Card 20 is caused to pass under head 40 and have its multiple tracks scanned by the combined driving actions of motor 36 and lead screw 45 as previously described. Data signals which are reproduced by head 40 are amplified by an amplifier 87 and presented to one input of a three input AND gate 88. A second input to AND gate 88 is obtained from latch 85 and is indicative that the start-file-mark of the control track has been detected. The third input to AND gate 88 is derived from the output of AND gate 83 and is true whenever a control track mark is detected by the control track reproduction head. When the second and third inputs to the AND gate 83 are true, data from the transaction track is passed from amplifier 87 to the microprocessor 74. Each transaction track has a unique code prerecorded for identifying and locating the track and such code, when reproduced therefrom, is utilized for control functions by the microprocessor 74.

At the end of each track of the card is recorded an end-of-file mark recording on the control track. This end-of-file mark is sensed by the control track reproduction head 38, amplified by amplifier 80 and recognized by an end-of-file mark decoder 89. When such a mark signal is generated, the output of decoder 89 becomes true which results in the resetting of latch 82, latch 85 and counter 84, thereby stopping the transmission of transaction track data to the microprocessor 74.

Data may be recorded as generated by the selective manual operation of the digitally encoded keyboard 13. A program memory 90 for the microprocessor 74 is preprogrammed or recorded to properly interact with and execute commands and data entered by means of the keyboard 13. Entered and/or reproduced data is stored in and retrievable from a read-write memory 91 under the control of microprocessor 74.

Data to be recorded on the card 20 is passed by microprocessor 74 to the recording head 41 through an OR gate 93 and a conventional digital recording electronic circuit 94 whenever the microprocessor 74 enables the transmission gate 95. When gate 95 is thus activated, it allows a bias oscillator 96 to generate and pass signals to an erase head drive 97 which energizes erase head 42 causing the head to erase data recorded in the region where a new recording is to be made. Such bias signals are also input to the recording electronic circuit 94 to allow the recording of new data information in a conventional manner. The area of the appropriate data track on which recording is to be effected, such as the first blank area passing the recording head or an area along which an old transaction recording is to be replaced, is determined by the microprocessor 74 from input signals originating from the transaction track read head 40 and synchronized by signals from the control track head 38 as described.

Display of input data and information which is read from the record card, is effected as follows:

The appropriate data or control information is transferred via microprocessor 74 to a refresh memory 99 according to instructions derived from the program memory 90. The refresh memory 99 contains information to be displayed and transfers such information to a character generator 100 through microprocessor 74, the output of which generator is connected to a display driver 101, such as a cathode ray tube driver, which drives and provides a display on a display screen of the CRT display 117. The information representative of the characters to be displayed is thus appropriately synchronized and displayed by providing sweep synchronization and deflection control signals for the write-beam of a cathode ray tube from the driver 101 derived from sync signals output by the microprocessor 74. The microprocessor obtains its input clock signals from a clock oscillator 102 having a stable, accurate feedback circuit 103, such as a cyrstal, both directly and appropriately divided by a divider circuit 104.

Clock oscillator 102 generates output signals which are passed to the input of a time code generator 105 which converts such signals to a code representative of the date and time of the entry. Such date/time code is appropriately decoded and conditioned for display by a decoder/driver 106 and is displayed by a time display 16 such as an LED or LCD array of character generating display units. The output of the time code generator 105 is also passed to the microprocessor 74 and to one input of an AND gate 107. When the other input to AND gate 107 is held true by a signal generated by microprocessor 74, the time code information is passed through OR gate 93 to recording electronics 94 which is connected to the recording head 41 for effecting the recording of such time information on the proper data track of the card 20.

Positive voice identification of the card owner may be effected by prerecording signals on the identification track of the card, which signals are derived when the card owner speaks selected words into the microphone 14, preferably when the owner of the card takes possession of the card. Such speech signals are preferably stored as high speed digital information which may be picked up by the identification track read head 43, amplified and conditioned by an amplifier 108. The output of amplifier 108 is passed to microprocessor 74 and is stored in an identification memory 109. The owner of card 20 may speak a coded word into the microphone 14 when the microphone is connected to receive representative words and pass speech signals, which are amplified by an amplifier 110, to an analog-to-digital converter 111 which is connected to the microprocessor 74. Microprocessor 74 will then compare information derived from recording of the same speech information with signals derived from speaking into the microphone at the time the card is utilized for identifying the holder of the card and, the microprocessor will thereafter effect proper operation of the display 17 to display whether or not the holder of the card is the person who recorded the signals on the identification track of the card.

System 10 may also be connected or otherwise operable to transmit information recorded on the card to a remote computer 112 which contains an archival memory 113 and a master voice identification memory 114, by means of an input/output interface 115 which is connected to microprocessor 74. Thus remote recording of the information derived from the transaction and operation of the system 10 including information generated by voice entry as described, may be accomplished to permit automatic voice-print analysis to be performed and the detection of unauthorized use of the card.

It is also noted that system 10 may also be used to perform credit analyzing operations such as the calculation of a current credit balance of an account to determine if the owner of the card is entitled to additional credit and to effect the updating of the balance of the account by signals derived from a central processing computer through the input-output interface subsystem 115, the microprocesor 74 and by means of recording electronics as previously described.

Additional improvements and embodiments of the invention are noted as follows:

1. While means shown in FIGS. 4 and 5 for applying vacuum pressure through holes 61 in the bottom wall of the cavity 19C into which a card is placed and held thereby during a magnetic transducing operation to present its upper recording surface flush with or slightly above the top surface of the turntable, positive pressure may also be applied through such orifices by a suitably controlled pump or compressure to perform either or both the functions of ejecting the card from the cavity after a transducing operation and to urge the card upwardly therefrom against the transducers during a transducing operation, if necessary. To prevent the card from being extracted or flying out of the cavity when the heads are out of alignment with the cavity 19C a rigid ring (not shown) may be supported with its bottom surface disposed just off the upper surface of the turntable to engage the upper surface of the card when urged by such air pressure upwardly. Such ring may be supported by the frames 26 and 35 having as its center the axis of rotation of the turntable and may be projectable from a retracted position by means of a suitable solenoid or motor supported by the horizontal bar of frame 35 to a position just off the turntable to permit the card to be inserted and removed from the cavity 19C.

2. An article manipulator or conveyor mechanism may be supported by base 25 and operably in response to signals generated by the computer or means for detecting record cards fed thereto to pick up or deliver a record card from a position adjacent the turntable to the cavity 10C and remove same therefrom at the end of a transducing cycle.

In other forms of the invention, it is noted that other types of recording and/or reproduction transducing means than magnetic transducing may be employed in a transducing apparatus of the type described. For example, a laser may be disposed on a support supported by the support for the turntable and may be operable to scan either a spiral track of a record card supported by the turntable or one or more concentric circular tracks thereof in a reading and/or reproduction operation. Such laser may be mounted and operable to directly project its beam of recording or reading radiation against either the entire surface of the turntable or just that portion thereof which contains a record card disposed as described. Such a laser or one having a greater intensity, may also be operable to record information along one or more circular record tracks of a record card by means of the intense radiation generated wherein the information recorded is applied to vary the intensity of the radiation beam generator or a laser in such a manner as to provide a variable electro-optically scannable recording along the track or tracks of the record card scanned thereby.

In another form, the turntable or rotatable support may contain a plurality of cavities or other means formed in or provided on its outer surface, each operable to receive, preposition and retain a different record card against a selected portion of the turntable or rotatable support whereby two or more record cards may be simultaneously scanned by a magnetic transducer or a radiation beam transducer, as the turntable rotates and to thereby effect recordings along one or more circular tracks of each record card and/or reproduced from one or more of such circular record tracks of such plurality of record cards.

One or more photoelectric cells may be supported just above the turntable by the frame 26 for scanning and detecting photooptical recordings such as microcavities provided in the surface of the record card by a laser or other laser recordings formed or otherwise provided therein along the plural parallel record tracks thereof, when such tracks are each selectively scanned by a narrow light beam such as generated by a laser which is also supported adjacent the photoelectric cell by the frame member 26.

In yet another form of the invention, the head mount 40A may contain a laser or other form of light source, a plurality of photoelectric cells, such as phototransistors, adapted to receive light from the light source after it is modulated in reflecting from the selected track or tracks of the record card and a plurality of thin optical fibers formed as light pipes which terminate in a mount therefore just off or against the upper surface of the record card positioned in the cavity 19C.

Figure 8:
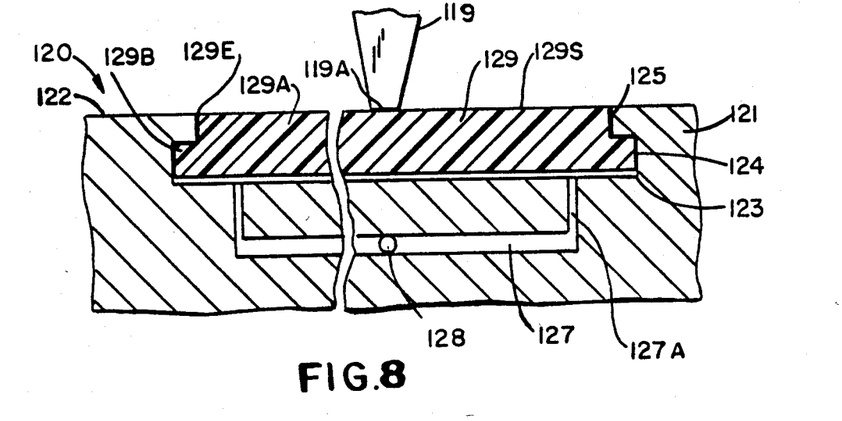
FIG. 8 is a partial side view with parts broken away and sectioned for clarity of a turntable and a record card supported thereby with its outer surface retained in operative alignment with the outer surface of the turntable.

In FIG. 8 is shown a magnetic card recording arrangement including an apparatus 120 having a circular or disc shaped turntable 121 of the type described with an outer planar surface 122 having a cavity 123 formed therein which extends to and is open at the periphery of the turntable to enable a specially shaped magnetic card 129 to be manually or automatically inserted therein to permit its outer surface to be scanned and read or recorded on by one or more magnetic transducers. The lateral side walls 124A and 124B of the cavity 123 are provided with overhanging and undercut portions 125A and 125B which serve to limit the upward travel of a magnetic record card 129, as shown, when urged by air pressure to cause the outer surface 129S of the card to be disposed in the plane of the outer surface 122 of the turntable 121 to permit the lower end face 119A of a magnetic head or bank of such heads 119 scanning and disposed just above the turntable on a film of air to operatively scan the magnetic recording material on the outer surface 129S of the card. If the card 129 is configured to cause its outer surface 129S to be disposed one or two thousandths of an inch or less above the plane of turntable outer surface 122 and the lateral upper edges 129E of the card are slightly bevelled or rounded when the card is made then the magnetic head 129 or bank of such heads and the pivoted or otherwise configured mount therefore may be operable to cause the end 119A of the head to ride just off the surface 122 of the turntable and to engage the surface 129S of the card and the magnetic recording material on the recording area of the card when the card is driven by the turntable into alignment with the head(s).

The card 129 is shaped by molding same of plastic, milling or properly laminating two layers of plastic together to provide the upper portion or layer 129A thereof having its lateral edges both inwardly of the lateral edges of the lower portion 129B of the card. The thicknesses of the upper and lower portions of the card are such as to permit the card to position illustrated in FIG. 8 and described above when the lateral stepped portions and the upper surfaces thereof engage the lower surfaces of the overhanging portions 125A ad 125B of the side walls of the cavity 123.

While a number of means may be provided to urge a card disposed in the cavity upwardly therein to the position shown in FIG. 8 such as a spring or springs disposed in the cavity to negative pressure applied to the upper surface of the card while in the cavity, means are provided in FIG. 8 for applying positive air pressure to the bottom surface of the card urging it upwardly and outwardly from the cavity to dispose its bottom surface, as shown, away from the bottom walls of the cavity and its upper surface in operable location with respect to the outer surface of the turntable. A network of ducts or passageways including an inlet duct, a header 127 and a plurality of branch ducts or capillaries 127A are provided in the wall of the turntable. The inlet duct 128 preferably extends from a source of positive pressure such as a small compressor or air scoop(s) formed in or attached to a wall or walls of the turntable to receive air, as the turntable rotates at high speed, under dynamic pressure and to direct same to the orifices in the bottom wall of the turntable.

It is noted that the overhanging portions 125A and 125B of the side wall of the cavity 123 may be replaced by slidable or pivoted members which may be removed or pivoted out of the way when it is desired to insert a record card from the top of the cavity rather than a side opening to the cavity as would be necessary in the arrangement shown in FIG. 8.

Figure 9:
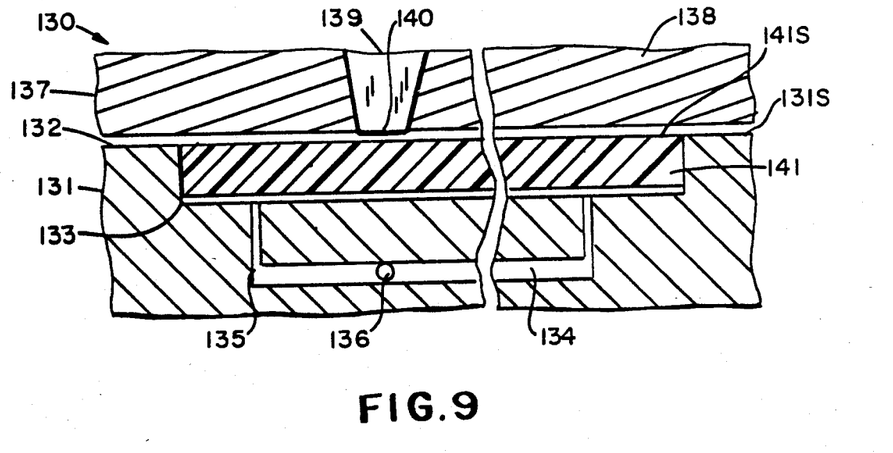
FIG. 9 is a side view with parts broken away for clarity and sectioned of part of a magnetic card transducing arrangement including a turntable, a magnetic head and a support for such head disposed above the turntable in alignment with a predeterminately disposed magnetic record card.

In FIG. 9 part of a magnetic recording-reproducing arrangement 130 of the type described includes a power rotated turntable 131 having a rectangular cavity 133 formed in its outer stratum with slightly tapered sidewalls for receiving a rectangular magnetic record card 141 having a thickness which is less than the depth of the cavity, as shown. A ducting system 134 including a plurality of small ducts 135 extending from a header, directs air from an inlet duct 136 from a pump, compressor or ram duct provided as described or or adjacent the turntable. Such air and/or negative air pressure above the card caused by the Bernouli effect as the turntable rotates, is employed to urge the card upwardly as the card is scanned by one or more magnetic heads 139 supported above the turntable on a suitable pivoted or otherwise moved mount as described. The operating end face 140 of such head engages or rides just off the card on a film of air as the card and turntable rotate beneath the head(s).

To limit the upward tavel of the card in the cavity so as to dispose its outer surface in the plane of the outer surface 132 of the turntable 131 or slightly above such surface, a disc or ring shaped member 138 which is shown supporting by or supported the magnetic head 139 and defining an assembly 137 therewith. The assembly 137 is supported off the base supporting the turntable by suitable means, such as described above, and is either held thereby or movable to position the flat bottom surface of the ring or disc 138 just off the upper surface 131S of the turntable 131 to provide a thin sheet-like volume 132 or space between the two surfaces. Air pressure applied to or developed within volume 132 as a result of rotation of the turntable 131 or applied thereto from a compressor such as the compressor generating the pressure applied to the cavity 133 though the openings therein, may be utilized to control the location of the card 141 within the cavity to dispose the upper surface 141S of the card aligned with or slightly above the upper surface 131S of the turntable 131 so as to permit the bottom surface 140 of the magnetic head 139 to engage or be disposed just above, about 0.0001", off the surface of the card or less to permit magnetic transducing with respect to the magnetic recording material coated on the surface of the card. The magnetic head 139 may be fixed or moveable with respect to the ring or disc 138 to bring its end closer to the surface of the card or in engagement therewith while the bottom flat surface of device 138 is disposed a greater distance from the card and upper surface 131S of the turntable. A microelectronic computer may be employed to receive signals from pressure transducers sensing air pressures applied to the cavity 133 and the volume 132 and to generate control signals for controlling one or more valves or pumps employed to provide such a pressure differential therebetween so as to cause the upper surface 141S of the card 141 to be positioned in the plane of the upper surface 131S of the turntable or at a predetermined location with respect to such surface.

As previously noted, if the card 141 of FIG. 9 is precision made as to thickness and the cavity 131 is properly configured, suction applied to the bottom of the cavity as described may hold the card in place with its outer surface in the plane of the outer surface 131S of the turntable allowing transducing to be effected as described.

We claim:

1. A record card transducing apparatus comprising:
a first support,
a rotatable second support rotatably supported on said first support,
record card retaining means supported by said second support for receiving, predeterminately locating and supporting a rectangular shaped record card having a plurality of parallel circular record tracks, which circular record tracks are centered at the axis of rotation of said rotatable second support when said record card is predeterminately located on said second support by said retaining means and wherein the recording surface of said record card is disposed, when said card is so located on said support in a plane which is normal to the axis of rotation of said second support and the circular paths of said circular record tracks extend beyond the borders of said record card,
power means for rotating said rotatable support about a fixed axis,
scanning means including transducing means supported by said first support, and
means for energizing and causing said transducing means to scan a selected track of said plurality of circular record tracks of a card which is predeterminately supported and retained by said second support and is rotating therewith to allow said transducing means to selectively transduce information with respect to said selected circular record track of a record card supported by said second support.

2. Record card transducing apparatus in accordance with claim 1 wherein said transducing means is a magnetic transducer operable to magnetically transduce information with respect to magnetic recording material of the record card supported by said rotatable support.

3. Record card transducing apparatus in accordance with claim 1 wherein said transducing means is a magnetic recording transducer operable to magnetically record information on the circular record track of a record card supported by said rotatable support while said rotatable support is power rotated.

4. Record card transducing apparatus in accordance with claim 1 wherein said transducing means is a magnetic pickup operable to reproduce information recorded on a magnetic record card supported by said rotatable support.

5. Record card transducing apparatus in accordance with claim 1 wherein said transducing means includes a photoelectric detector operable to detect optical variations in recordings provided on a card supported by said rotatable support and generate output electrical signals defining said recordings.

6. Record card transducing apparatus in accordance with claim 1 wherein said transducing means includes a laser.

7. Record card transducing apparatus in accordance with claim 1 wherein said transducing means includes a laser operable to generate and project a narrow beam of light against the surface of a record card supported by said rotatable support and photoelectric detection means for receiving light from said laser after it has reflected off at least a portion of the circular record track of a record card supported by said rotatable support.

8. Record card transducing apparatus in accordance with claim 1 wherein said transducing means is a radiation beam generating means operable to generate a beam of intense radiation modulated with information and to direct said radiation beam against a circular record track of a record card supported by said rotatable support.

9. Record card transducing apparatus in accordance with claim 1 wherein said transducing means is a radiation beam generating means operable to generate a beam of intense radiation modulated with information and to direct said beam against a circular record track of a record card supported by said rotatable support while said rotatable support is power rotated so as to cause said beam to record information on said circular record track.

10. Record card transducing apparatus in accordance with claim 1 wherein said transducing means is a radiation beam generating means and means for pulsing said radiation beam generating means in a manner to effect pulses of beam radiation defining information to be recorded thereby on a record card supported by said rotatable support.

11. Record card scanning apparatus in accordance with claim 10 wherein said radiation beam generating means is operable to generate pulses of radiation of sufficient intensity to burn holes in the recording surface along the circular record track means of a record card supported by said rotatable support.

12. Record card transducing apparatus in accordance with claim 1 wherein the circular record track of a record card supported by said rotatable support comprises a plurality of concentric circular record tracks each having centers at the center of rotation of said rotatable support and means for controlling the relative movement between said transducing means and said rotatable support so as to effect the scanning alignment of said transducing means with a selected circular track of a record card supported by said rotatable support so as to permit said transducing means to effect a transducing operation with respect to a said selected track of said card as the card is moved in a circular path by the rotating rotatable support.

13. Record card transducing apparatus in accordance with claim 1 wherein said rotatable support contains a top wall and has a cavity formed in said top wall conforming to the shape of the record card supported by said rotatable support whereby said cavity is so located that, when a record card is predeterminately disposed in said cavity, its circular record track has as its center, the center of rotation of said rotatable support.

14. Record card transducing apparatus in accordance with claim 13 whereby said record card contains a magnetic recording surface and said rotatable support contains means for retaining said record card in said cavity with its magnetic recording surface being substantially in the plane of the upper surface of said top wall of said rotatable support.

15. Record card transducing apparatus in accordance with claim 14 including means for automatically removing a record card from said cavity of said rotatable support after completing a transducing operation with respect to the circular track means of said record card.

16. Magnetic transducing apparatus for transducing signals with respect to magnetic recording members comprising in combination:
a first support,
means for rotationally supporting and power rotating said first support about a fixed axis,
said first support having retaining means for aligning, predeterminately locating and holding a rectangular record member, such as a rectangular card or sheet, having a plurality of concentric circular record tracks and retaining said record member secured to said first support with a flat magnetic recording surface thereof disposed in a plane which is normal to the axis of rotation of said retaining means so as to permit the circular record tracks of the flat recording surface to be predeterminately scanned during the rotation of said record member with said first support as said first support is rotated,
magnetic transducing means and means for disposing said magnetic transducing means in operative relation with respect to said first support to permit said said transducing means to magnetically transduce signals with respect to a magnetic record card retained by said retaining means on said first support as said magnetic record card is rotated with said first support.

17. Magnetic transducing apparatus in accordance with claim 16 wherein said first support is in the configuration of a disc.

18. Magnetic transducing apparatus in accordance with claim 17 wherein said retaining and aligning means includes a cavity in the surface of said disc substantially the configuration of a magnetic record member adapted to be supported by said first support.

19. A transducing apparatus in accordance with claim 18 including suction means for retaining a magnetic record member within said cavity in the surface of said disc.

20. A record card transducing apparatus comprising in combination:
a first support,
a second support rotatably supported on said first support for rotation about a fixed axis,
means for retaining a rectangular record card predeterminately aligned on said rotatable support with a recording surface of said rectangular card being in a plane which is normal to the axis of rotation of said second support and offset from the center of rotation of said second support,
said record card having a plurality of parallel concentric circular record tracks which are centered at the axis of rotation of said rotatable support when said record card is predeterminately located on said rotatable support by said retaining means, and wherein the recording surface of said record card is disposed, when said card is so predeterminately located, on said rotatable support in a plane which is normal to the axis of rotation of said rotatable support and the circular paths of said circular tracks extend beyond the borders of said record card, power means for rotating said rotatable support about a fixed axis, scanning means including a transducer supported by said first support, means for effecting and controlling relative movement between said support for said transducer and said rotatable support while the card is predeterminately supported and retained by said rotatable support and is rotating therewith so as to allow said transducer to selectively scan a selected of said circular tracks of said record card, and means for energizing said transducer while said rotatable support is rotated and said transducer scans said selected circular record tracks of the card supported by the rotating support therefor to cause said transducer to transduce information with respect to said selected record track of said record card.

* * * * *